April 19, 1955     F. P. BROOKS ET AL     2,706,665
FLOATING GAS SEAL BUSHING

Filed Oct. 23, 1952     2 Sheets-Sheet 1

INVENTORS
FRANK P. BROOKS
ALEXIS PASTUHOV
BY
AGENT

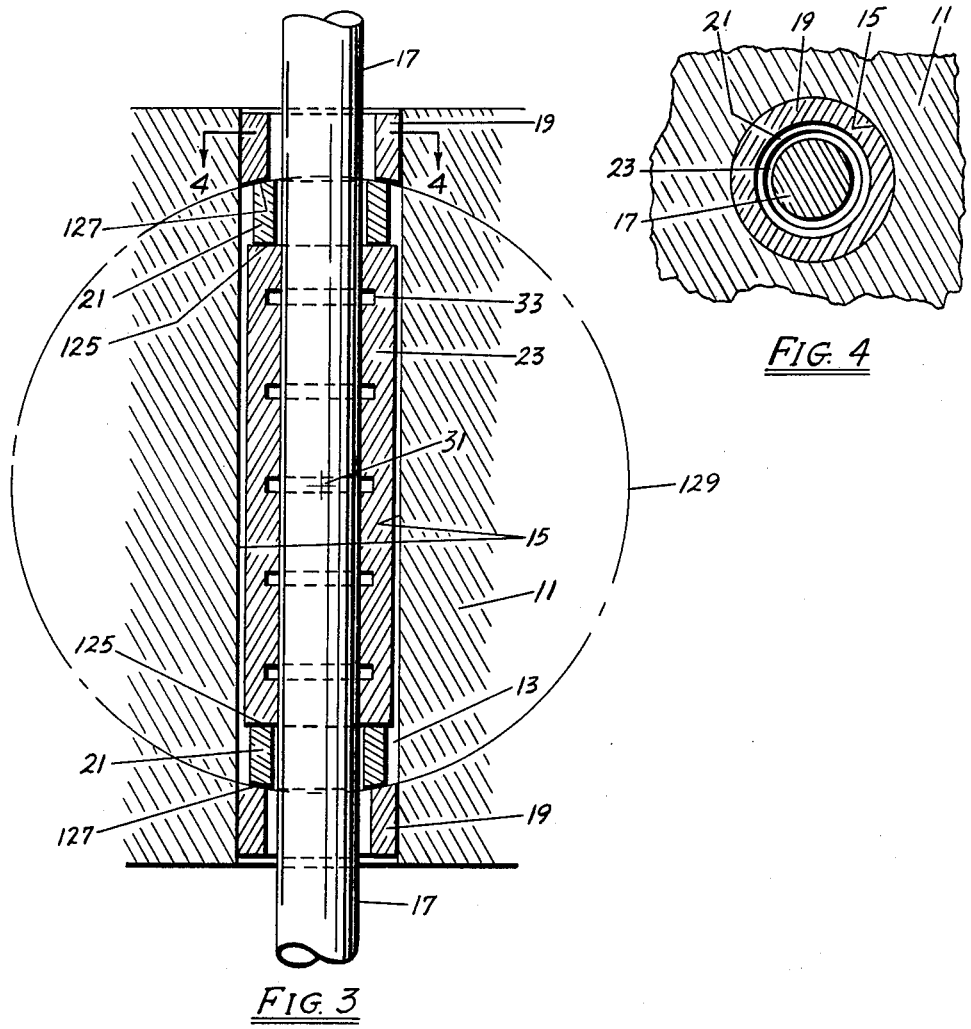

United States Patent Office 2,706,665
Patented Apr. 19, 1955

2,706,665

FLOATING GAS SEAL BUSHING

Frank P. Brooks, Winchester, and Alexis Pastuhov, Natick, Mass., assignors to Arthur D. Little, Inc., Cambridge, Mass., a corporation of Massachusetts Application October 23, 1952, Serial No. 316,514

8 Claims. (Cl. 308—3.5)

This invention relates to gas seal bushings, and more particularly to bushings adapted to restrict the flow of high pressure, low temperature gas in an axial direction along a reciprocating rod.

Theoretically, a reciprocating rod should require only one degree of freedom, viz. that of purely back and forth (reciprocating) motion. In practice, however, such factors as manufacturing tolerances, vibration, and wear cause misalignment so that the rod will also have both translational motion in a radial plane (side-by-side, or radial, motion) and rotational motion in an axial plane (oscillating motion). These additional motions cause wear upon both the rod and bushing with consequent decrease in the effectiveness of the seal between them.

The usual means for overcoming this difficulty is to provide one or more stuffing boxes with soft packing mounted on the bushing and providing sliding and sealing contact with the reciprocating rod. At extreme low temperatures, such as those of liquid air or colder, e. g. at liquid hydrogen or liquid helium temperatures, all known packing materials become hard and brittle and therefore are incapable of maintaining an effective seal if the reciprocating rod has other than a purely reciprocatory motion.

It is therefore an object of the present invention to provide bushings which permit both radial and oscillating motions, as well as the normal reciprocating motion, of a reciprocating rod, while at the same time maintaining an effective seal against any substantial leakage of gas along said rod through the bushing. It is also an object to provide bushings which are effective to maintain such a seal at extreme low temperatures, e. g. even as low as those of liquid hydrogen or liquid helium, and also at pressure differentials which may be as high as several atmospheres.

These objects are accomplished, as shown in more detail hereinafter, by providing a bushing comprising a plurality of annular sleeves or collars in area contact with each other, some of said area contacts being in spherical conformation and others flat (planar), and all providing sliding contact and effective sealing against substantial gas leakage.

For a more complete understanding of the present invention, reference is made to the accompanying drawings, which are however to be understood as illustrative rather than limiting, and wherein:

Fig. 3 is a longitudinal cross-sectional view of another form of the invention; and Fig. 4 is a cross-sectional view taken along the line 4—4 of Fig. 3.

Figures 1, 2:
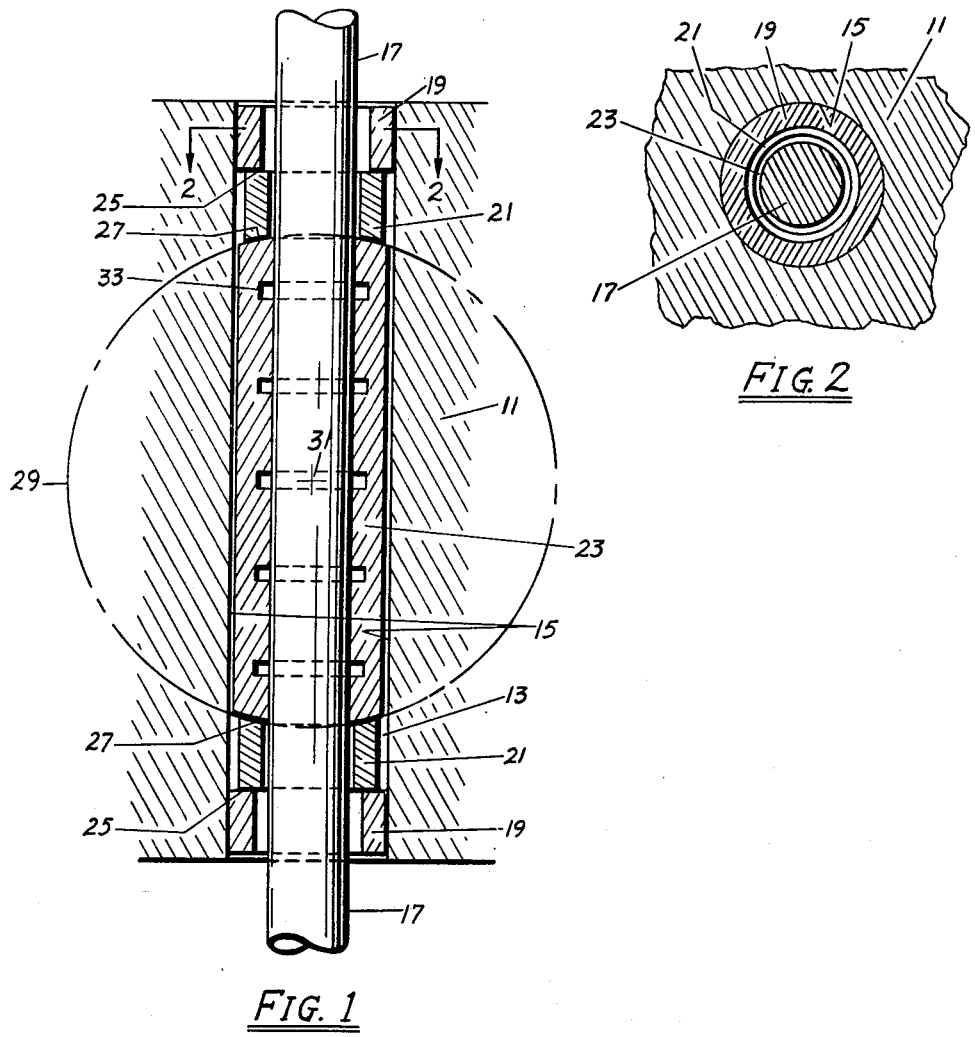
Fig. 1 is a longitudinal cross-sectional view of a preferred from of the present invention.
Fig. 2 is a cross-sectional view taken along the line 2—2 of Fig. 1.

In Figs. 1 and 2 of the drawings, the numeral 11 refers to a supporting structure or the like having a passage or opening 13 therethrough, the walls of which are designated by the numeral 15. Through this opening 13 passes the piston rod 17 to be supported, and said walls 15 hold the bushing structure of this invention. Opening 13 will ordinarily be of cylindrical shape, although any other convenient shape may be used as long as it does not interfere with the operation of the piston rod 17 or the movement of the bushing structure. This bushing structure as shown in Figs. 1 and 2 comprises supporting collars or sleeves 19, 19, intermediate collars or sleeves 21, 21, and rod-sealing collar or sleeve 23. Supporting collars 19, 19 are rigidly and gas-tightly fixed against walls 15, as by press-fitting, so that they do not change position, and are spaced away from rod 17. Intermediate collars 21, 21 are spaced apart from walls 15 and also from rod 17, and abut collars 19, 19 along surfaces 25, 25 which are lapped together to provide a slidable, relatively gas-tight seal. Rod-sealing collar 23 is spaced apart from walls 15 and slidably supports rod 17 in as gas-tight relation as is desirable while permitting free reciprocation of said rod. This collar 23 abuts intermediate collars 21, 21 along surfaces 27, 27 which are also lapped together to provide a slidable, relatively gas-tight seal. Each of surfaces 25, 25 is planar—i. e. in a plane perpendicular to the normal axis of rod 17—while each of surfaces 27, 27 is part of one spherical surface, the imaginary part of which is indicated by the dot-dash line 29 and which has its center 31 located at substantially the center of gravity of that portion of the rod 17 passing through the bushing assembly (i. e. at the center of the bushing assembly). Rod-sealing collar 23 is preferably provided with a plurality of grooves 33, the principal purpose of which is to serve as collecting spaces for any matter which may be worn off from rod 17 and collar 23 during operation, and which also assist in the effectiveness of the seal between rod and collar. While the amount of worn-off matter is very small if the contacting parts are properly machined, it is nevertheless preferable to collect it by means of these grooves 33, so as to prevent this matter from causing any further wear of rod 17 and collar 23.

In operation, if rod 17 has purely reciprocatory motion, the various collars of the bushing maintain their positions without any relative movement. However, whenever the rod also has radial (side-to-side) motion, it imparts such motion to collar 23 which in turn imparts that motion to collars 21, 21. These latter collars thereupon slide against collars 19, 19 along the planar surfaces 25, 25, thereupon accommodating the radial component of the motion of rod 17 and thus avoiding wear. Likewise, when rod 17 has oscillatory motion (i. e. motion about center 31), it imparts such motion to collar 23 which thereupon slides against collar 21, 21 along the spherical surfaces 27, 27. When the motion of rod 17 has both radial and oscillatory motion, as well as its normal reciprocatory motion, sliding of the several collars will therefore take place along both the spherical surfaces 27, 27 and the planar surfaces 25, 25.

Figs. 3 and 4 show a modification of the structure of Figs. 1 and 2 wherein like parts have like numbers. The two structures differ only in that the spherical surfaces, represented by numerals 27, 27 in Fig. 1, are at the junctions of supporting collars 19, 19 and intermediate collars 21, 21, and are designated by the numerals 127, 127 in Fig. 3; and the planar surfaces, represented by numerals 25, 25 in Fig. 1, are at the junctions of intermediate collars 21, 21 and rod-sealing collar 23, and are designated by the numerals 125, 125 in Fig. 3. Spherical surfaces 127, 127 form part of the surface of an imaginary sphere represented by the dot-dash line 129, having its center located at point 31 as described in connection with Fig. 1.

In each example, each member of the pair of planar surfaces is preferably at substantially the same distance from center 31 as is the other. As already indicated, the same is true of each member of the pair of spherical surfaces.

In operation, any radial motion of rod 17 will be accommodated by the sliding of collar 23 against collars 21, 21 along planar surfaces 125, 125, while any oscillatory motion of the rod will be accommodated by sliding of collars 21, 21 against supporting collars 19, 19 along the spherical surfaces 127, 127.

It will be obvious that the spacing of the inside surfaces of collars 19, 19 from rod 17 will be sufficiently great to allow for the expected amount of radial and oscillatory motion of rod 17 without the latter's impinging upon the said inside surfaces of collars 19, 19. Likewise, the spacing between collar or sleeve 23 and walls 15 is sufficient to permit the expected radial and oscillatory motion of said collar due to motions of rod 17, as are also the spacings between collars 21, 21 and both walls 15 and rod 17.

Reference has been made herein to the fact that the bushing of this invention should provide an effective gas seal. The degree of gas-tightness will of course depend upon the accuracy of machining of the parts, and the closeness of fit, and hence may be made greater or less depending also upon the degree of gas-tightness required for any given purpose. Typically, there will be a piston at one end of the rod 17 and a crosshead slide at the other, and the whole may be enclosed in a pressure-tight compartment. Under such conditions the pressure within the space on the piston side of structure 11 will vary from high to low as the piston moves back and forth, while the pressure on the crosshead side will stay at a more or less constant intermediate value. This value will fluctuate more or less with the fluctuation of pressure on the piston side of structure 11, but the bushing of this invention is preferably made sufficiently resistant to the passage of gas that the pressure on the crosshead side of structure 11 remains within a fairly narrow range during operation of the device.

We claim:

1. A bushing adapted to accommodate a reciprocating rod and comprising five collars arranged in line, each of said collars abutting the next-in-line collar along a surface area, thereby providing two pairs of surfaces, one member of each of said pairs being located on one side of the center of the middle one of said five collars and the other member of each of said pairs being located on the other side of said center, the two end collars being in fixed position and spaced away from the path of said rod, the middle collar being in the form of an elongated sleeve and being arranged for elongated sliding-fit contact with said rod, and the two intermediate collars and said two end collars being spaced away from the path of said rod, one pair of said surface areas being planar and the other being a part of the surface of one sphere, all parts of said bushing being adapted to withstand temperatures at least as low as that of liquid hydrogen without change in physical state.

2. A bushing adapted to accommodate a reciprocating rod and comprising five collars arranged in line, each of said collars abutting the next-in-line collar along a surface area, thereby providing two pairs of surfaces, one member of each of said pairs being located on one side of the center of the middle one of said five collars and the other member of each of said pairs being located on the other side of said center, the two end collars being in fixed position and spaced away from the path of said rod, the middle collar being in the form of an elongated sleeve and being arranged for elongated sliding-fit contact with said rod, and the two intermediate collars and said two end collars being spaced away from the path of said rod, each of the outer pair of said surface areas being in a plane at right angles to the axis of said rod and the inner pair of said surface areas forming part of the surface of a sphere having its center at substantially the center of said bushing, all parts of said bushing being adapted to withstand temperatures at least as low as that of liquid hydrogen without change in physical state.

3. A bushing adapted to accommodate a reciprocating rod and comprising five collars arranged in line, each of said collars abutting the next-in-line collar along a surface area, thereby providing two pairs of surfaces, one member of each of said pairs being located on one side of the center of said middle collar and the other member of each of said pairs being located on the other side of said center, the two end collars being in fixed position and spaced away from said rod, the middle collar being in the form of an elongated sleeve and being arranged for elongated sliding-fit contact with said rod, and the two intermediate collars and said two end collars being spaced away from said rod, each of the inner pair of said surface areas being in a plane at right angles to the axis of said rod and the outer pair of said surface areas forming part of the surface of a sphere having its center at substantially the center of the bushing, all parts of said bushing being adapted to withstand temperatures at least as low as that of liquid hydrogen without change in physical state.

4. A bushing assembly consisting of a supporting structure having wall means defining a passageway therethrough, an end collar at each end of said wall means and rigidly fixed thereto, an intermediate collar abutting each of said end collars in sliding area endwise contact and positioned within said passageway and spaced away from said wall means, and an elongated central sleeve abutting each of said intermediate collars in sliding area endwise contact, said sleeve being provided with a plurality of spaced-apart circumferential grooves on its inner surface and being spaced away from said wall means and being adapted to provide an elongated sliding fit about a piston rod reciprocating within said passageway, and said collars being spaced away from the path of said piston rod, the sliding area contacts between said end collars and said intermediate collars being planar and at right angles to the path of said rod, and the sliding area contacts between said intermediate collars and said central sleeve forming part of the surface of the same sphere.

5. A bushing comprising a first pair of collars, a second pair of collars, and an elongated sleeve, said bushing being arranged to accommodate a reciprocating rod and adapted to adjust itself to the motions of said rod, said first pair of collars being fixed in position and spaced away from the path of said rod, said sleeve being in sliding-fit relation with said reciprocating rod, and being located intermediate the positions of the members of said first pair of collars, and said second pair of collars being positioned one on each end of said sleeve and between said sleeve and one of said first collars, each of said second pair of collars being in sliding area contact with said sleeve and with the corresponding one of said first collars, said sleeve being freely movable in a generally sideways direction to accommodate radial and oscillatory motion of said rod and each of said second collars being spaced away from the path of said rod and also being freely movable in a generally sideways direction, all parts of said bushing being adapted to withstand temperatures at least as low as that of liquid hydrogen without change in physical state.

6. Apparatus of the class described comprising a reciprocating rod, a supporting structure having a passageway defined by a wall, through which passageway said rod extends, and a bushing assembly positioned within said passageway and adapted to provide a sliding-fit contact with said rod, said bushing comprising five collars arranged in end-to-end sliding contact along surfaces two of which are in planes at right angles to the axis of said rod and two of which form a portion of the surface of one sphere the center of which is located substantially upon the axis of said rod at a point substantially equidistant from the ends of said bushing assembly, said two first-mentioned surfaces also being substantially equidistant from said center, the outer two of said collars being rigidly attached to said cylindrical wall, the middle one of said collars being spaced away from said wall and being in extended sliding-fit contact with said rod, and the others of said collars being spaced away both from said wall and from said rod, all parts of said rod, supporting structure and assembly being adapted to withstand temperatures at least as low as that of liquid hydrogen without change in physical state.

7. Apparatus according to claim 6 wherein said two second-mentioned surfaces are nearer to said center than are the said two first-mentioned surfaces.

8. A bushing adapted to accommodate a reciprocating rod consisting of five collars arranged in end-to-end sliding contact along surfaces two of which are in planes at right angles to the lengthwise axis of said bushing and two of which form a portion of one sphere the center of which is located substantially upon said axis at a point substantially equidistant from the outer ends of said bushing, said two first-mentioned surfaces also being substantially equidistant from said center, the outer two of said collars being maintained in fixed position and spaced away from the path of said rod, the middle one of said collars being provided with a plurality of spaced-apart circumferential grooves on its inner surface and being arranged to be in elongated sliding-fit contact with said rod, and the others of said collars being spaced away from the path of said rod, all of said collars except said two outer collars being free to move in directions substantially at right angles to said axis, all parts of said bushing being adapted to withstand temperatures at least as low as that of liquid hydrogen without change in physical state.

References Cited in the file of this patent

UNITED STATES PATENTS

| | | |
|---|---|---|
| 2,119,244 | Pranger | May 31, 1938 |
| 2,267,183 | Williams | Dec. 23, 1941 |
| 2,628,112 | Hebard | Feb. 10, 1953 |